No. 800,196. PATENTED SEPT. 26, 1905.
A. WINTER.
DEVICE FOR LOADING MANURE.
APPLICATION FILED APR. 19, 1905.
3 SHEETS—SHEET 1.
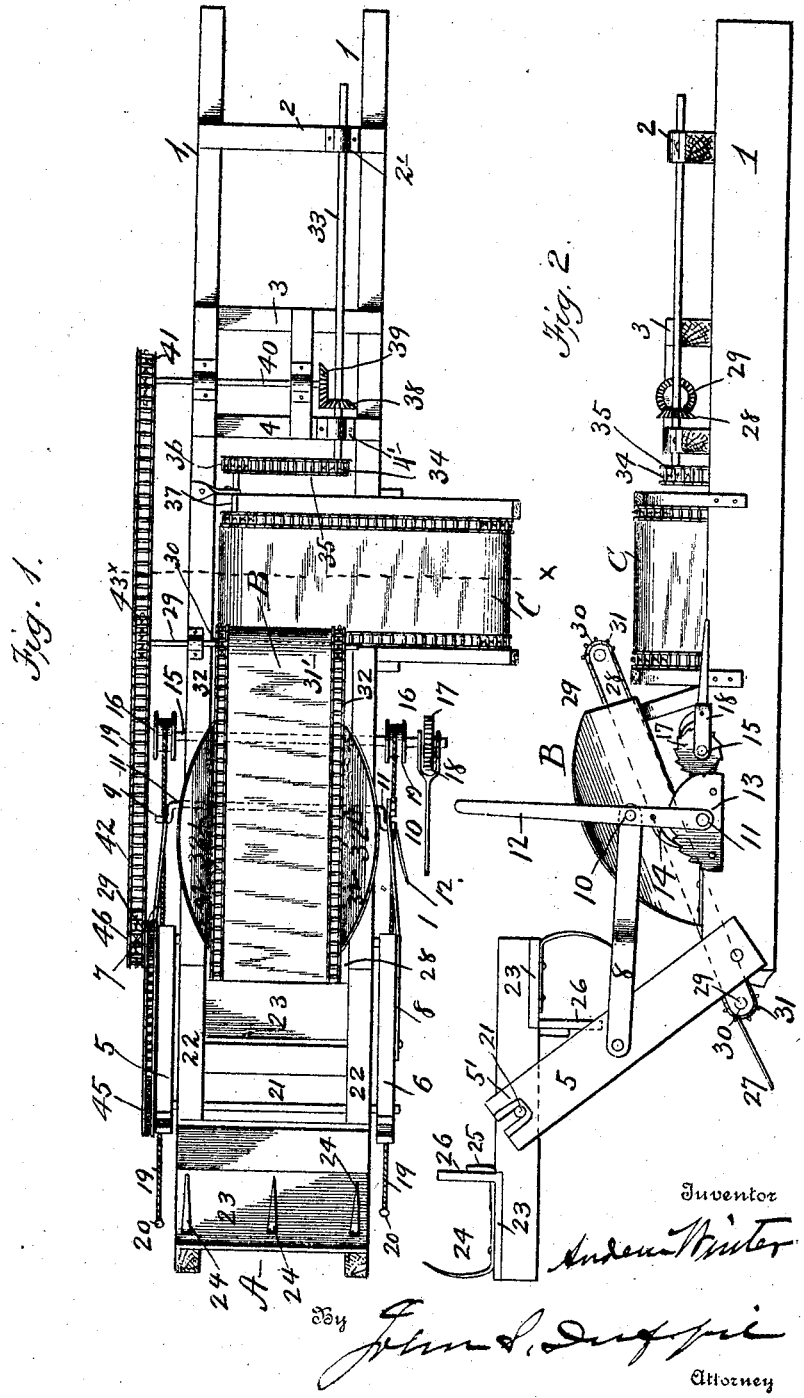

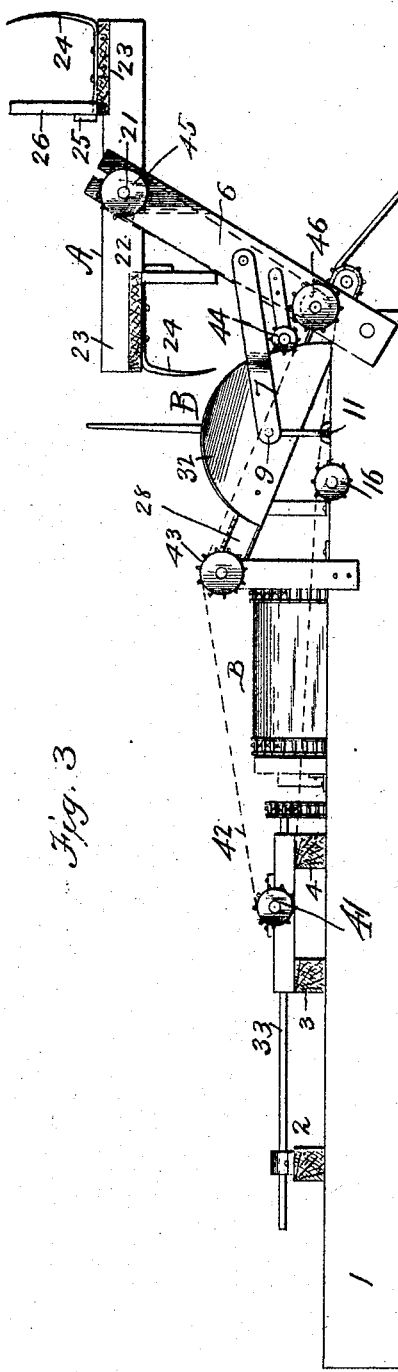

No. 800,196. PATENTED SEPT. 26, 1905.
A. WINTER.
DEVICE FOR LOADING MANURE.
APPLICATION FILED APR. 19, 1905.
3 SHEETS—SHEET 3.
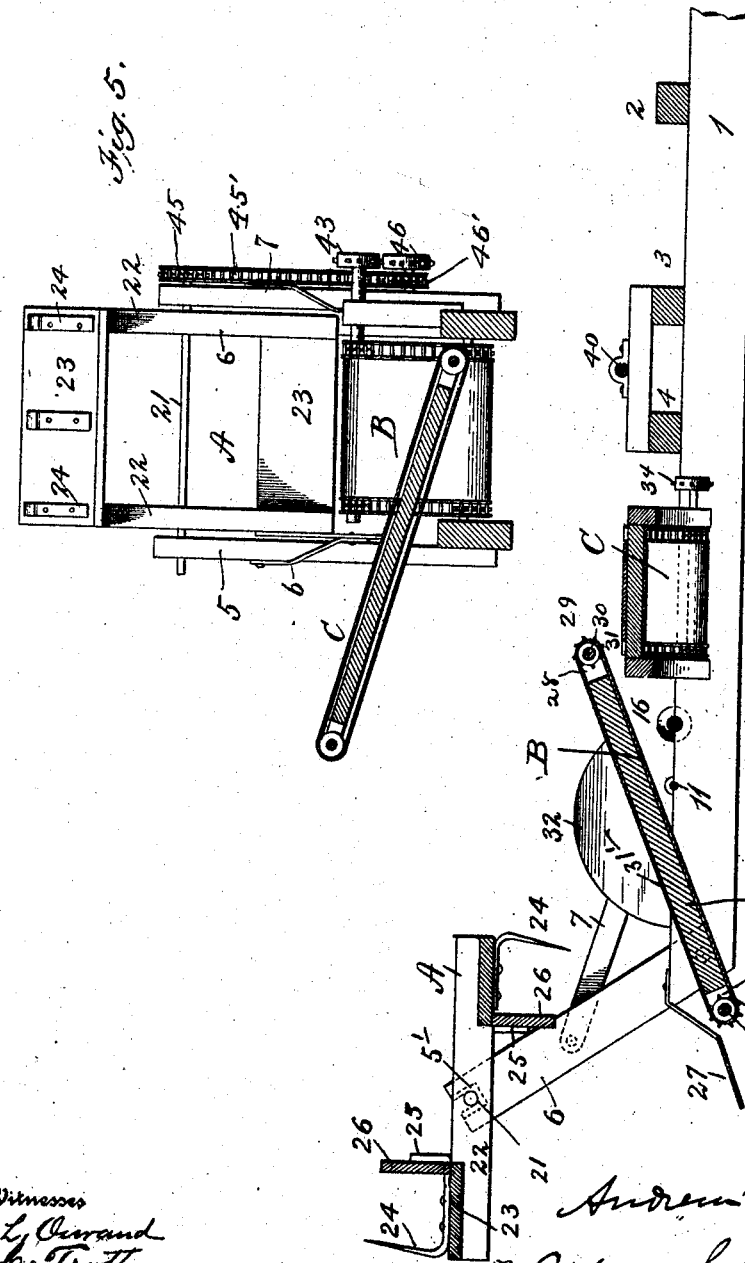

UNITED STATES PATENT OFFICE.

ANDREW WINTER, OF HENDERSON TOWNSHIP, SIBLEY COUNTY, MINNESOTA.

DEVICE FOR LOADING MANURE.

No. 800,196.          Specification of Letters Patent.          Patented Sept. 26, 1905.

Application filed April 19, 1905. Serial No. 266,514.

*To all whom it may concern:*

Be it known that I, ANDREW WINTER, a citizen of the United States, residing in the township of Henderson, in the county of Sibley and State of Minnesota, have invented new and useful Improvements in Devices for Loading Manure, of which the following is a specification.

My invention is a machine for elevating manure and other similar material, carrying it up inclines, and depositing it in a wagon or other receptacle; and it consists of an elevator revolving fork to pick up the manure and deposit it on an elevator, said elevator depositing the manure on a second elevator, which in turn deposits it in the wagon, and means for operating the machinery and means for operating the revolving fork, the elevator, and for propelling the device.

In the accompanying drawings, Figure 1 is a top plan view of my invention. Fig. 2 is a side elevation showing the front side of the machine, considering the position of the elevated revolving fork as the front end of the machine. Fig. 3 is a side elevation of the rear side of the machine. Fig. 4 is a vertical longitudinal sectional view of the machine. Fig. 5 is a vertical longitudinal sectional view cut on the line X X looking from the rear end of the machine, Fig. 1.

My invention is described as follows:

The numerals 1 represent two longitudinal side beams that rest on the ground. These side beams are secured together by cross-beams 2, 3, and 4. Two beams 5 and 6 are pivoted to the front end of said side beams 1. The free ends of these beams 5 and 6 are adapted to be lowered and raised by side braces 7 and 8, the forward ends of which are pivoted to said beams 5 and 6 and their rear ends to crank-arms 9 and 10 of rod 11, which is secured crosswise of the frame in suitable bearings. To the crank-arms 10 of said rod 11 is pivoted a lever 12, the lower end of which is pivoted to a ratchet-plate 13, and just above the ratchet-plate and adapted to work in the teeth thereof is pivoted to said lever 12 a dog 14. Immediately to the rear of said rod 11 is journaled to said frame in suitable bearings a rod 15, to each end of which is rigidly secured a spool 16. To the extreme and front end of said rod 15 is secured a ratchet-wheel 17, operated by a lever and dog 18. Secured to and working around each spool is a cable 19. These cables 19 run forward and are attached to pins 20, driven in the ground in front of the machine, and by operating said lever 18 said machine is adapted to be propelled forward by means of said spools and cables. Journaled in the upper ends of said beams 5 and 6 and in suitable boxings 5' is a revolving fork A, consisting of a shaft 21, on which are secured two beams 22, pierced and secured at their middles to said shaft 21. The said two beams are held together by boards 23. To the front side of each board are secured tines or forks 24, which forks pick up the manure and carry it over backwardly and throw it on the elevator B. The other ends 25 of said forks or tines run inwardly and then outwardly at an angle of ninety degrees to the boards 23 and support dashboards 26. These dashboards are to hold the manure and keep it from spilling until the revolving fork reaches the proper position to deposit it on said elevator B. Secured to the front ends of said side beams is a scoop or scraper 27, that scoops the manure up from the ground and deposits it on the elevator B as the machine is propelled forward.

The elevator B consists of two side beams 28 and suitable cross-beams. In the ends of these side beams 28 are journaled on axles 29 rollers 30, and on the ends of these rollers are secured sprocket-wheels 31. Working around these rollers 30 is an apron 31'. This constitutes the longitudinal elevator B, the forward end of which reaches nearly to the ground, while the rear end is considerably elevated. Secured to each side of this elevator are side boards 32 to keep the manure from falling off from either side of the elevator. Working over these sprocket-wheels 31 are sprocket-chains 32, to which the edges of the elevator-apron are attached.

Working immediately in front of longitudinal elevator B is a similarly-constructed cross-elevator C, arranged to catch the manure deposited by the elevator B and to carry it up and deposit it in a wagon or other elevated receptacle.

Near the front ends and on the upper edges of the side beams 1 are secured cross-beams 2, 3, and 4. Running through a bearing 4' on cross-beam 4 and through a bearing 2' on cross-beam 2 is a drive-shaft 33, the rear end of which is square to carry a drive-wheel. On the extreme front end of said shaft 33 is a sprocket-wheel 34, which carries a sprocket-chain 35 on a sprocket 36 of the shaft 37, that drives the sprocket-wheels and belt of the elevator C. Not far from the front end of the shaft 33 and between the cross-beams 3 and 4 there is secured on said shaft 33 a gear-wheel 38, which meshes with a gear-wheel 39, borne on axle 40, which bears on its outer end a sprocket-wheel 41. Running over said sprocket-wheel is a sprocket-chain, (represented by the dotted lines 42,) and over a sprocket-wheel, which operates the apron of the elevator B, thence under the regulating sprocket-wheel 44, thence over the sprocket, and thence back and around the first sprocket-wheel 41. Secured to the shaft of the sprocket-wheel 46 and also to said sprocket-wheel 46 is a smaller sprocket-wheel 46', and to the end of the axle 21 of the fork A is a sprocket-wheel 45 on a line with said sprocket-wheel 46', and running over these two sprocket-wheels is a sprocket-chain 45'. Thus it will be seen that the belts on both the elevators and the revolving fork are run by the shaft 33.

The elevator B may also be provided with side boards, if desired.

I do not desire to be understood as confining myself to every detail as shown and above described, because many slight changes in the forms and locations of the parts comprising the invention might be made without departing from the spirit, purpose, and usefulness of the same, and therefore I claim my invention with any and every change that might be made therein, so long as the spirit, purpose, and usefulness are maintained.

Having described my invention, what I claim as new, and desire to secure by Letters Patent, is—

1. In a manure-elevating device the combination of a longitudinal rectangular frame, consisting of side and cross beams; a longitudinal elevator secured to the front end of said frame; a scoop also secured to the front end of said frame, and adapted to carry manure onto said elevator when the frame is moved forward; a cross-elevator adapted to receive the manure from the longitudinal elevator and deposit it in an elevated receptacle; beams adjustably secured to the front end of said frame; a ratchet-plate secured to said frame; a rod provided with crank-arms pivoted to said frame, one end in said ratchet-plate, and the other in a suitable bearing; adjusting-braces, one end secured to said adjustable beams, and the other to said crank-arms; a lever and dog, adapted to hold said braces and beams to proper adjustment, and a revolving fork, journaled in the upper ends of said last-mentioned beams, and adapted to gather manure and deposit it on the longitudinal elevator, said devices being operated by suitable shafts, sprocket-wheels and sprocket-chains, substantially as shown and described, and for the purposes set forth.

2. In a manure-elevator as described, a revolving fork, consisting of a shaft journaled in the upper ends of two beams; beams centrally pierced and secured on said shafts; end boards secured to the beams, forming a rectangular frame; tines, adapted to gather the manure, secured to the faces of said boards; the blunt ends of said tines turn parallel to the sharp ends thereof, and bearing a dash-board at an angle of ninety degrees to said end boards, substantially as shown and described, and for the purposes set forth.

In testimony whereof I affix my signature in presence of two subscribing witnesses.

ANDREW WINTER.

Witnesses:
J. A. ANDEREGG,
JOHN BACHMAN.